Aug. 27, 1940.                W. S. BRINK                2,213,063
                           WHEEL CONSTRUCTION
                           Filed Feb. 24, 1939
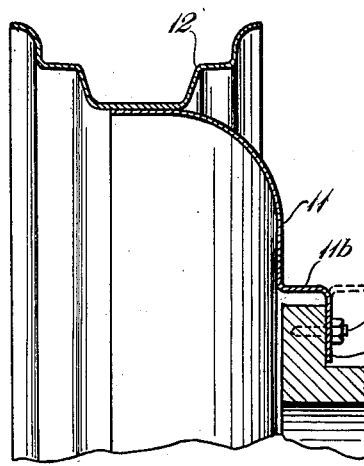
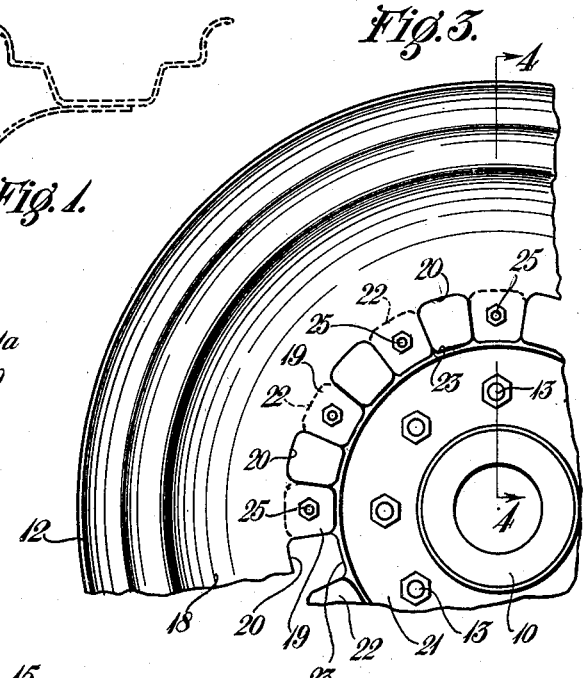
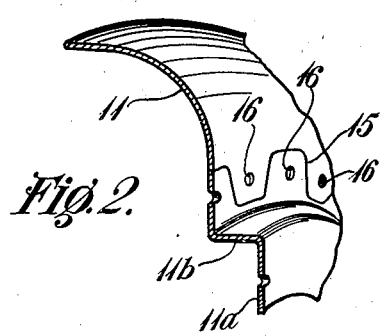
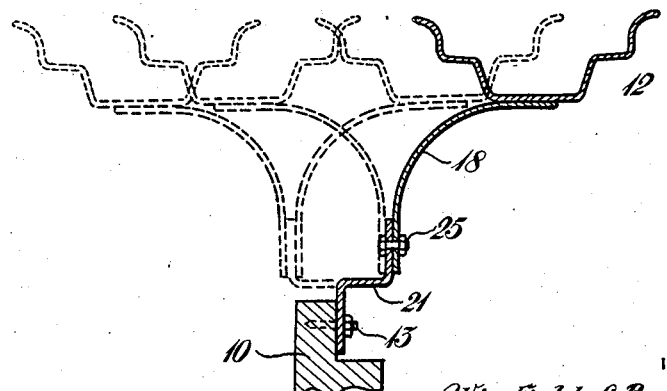
INVENTOR
Winfield S. Brink
BY
ATTORNEYS Patented Aug. 27, 1940

2,213,063

UNITED STATES PATENT OFFICE 2,213,063

WHEEL CONSTRUCTION

Winfield S. Brink, Akron, Ohio, assignor to The Firestone Tire & Rubber Company, Akron, Ohio, a corporation of Ohio Application February 24, 1939, Serial No. 258,221

2 Claims. (Cl. 301—9)

This invention relates to wheel constructions, and more especially it relates to improved construction of disc wheels having tire rims thereon wherein the latter is positionable in different axial positions with relation to the centerline of the vehicle, whereby the tread width of the vehicle may be varied. The invention achieves its greatest utility in disc wheels for agricultural vehicles such as have to straddle rows of crops of different spacings with relation to each other, or to travel in plowed furrows which may vary in spacing under some circumstances.

Various expedients have been utilized heretofore for varying the tread width of a vehicle. For example, it has been proposed to provide wheel hubs that are slidably adjustable axially of the axle on which they are mounted. Such arrangement is far from satisfactory, for the reason that it requires greater use of expensive axle steel, and the hub is likely to become so corroded at the axle as to be difficult to remove therefrom. Another means for accomplishing this end has been adapters that are interposed between the tire rim and the spokes or disc of a wheel, but such means are not only expensive, but are mountable and changeable only by the expenditure of considerable effort and time. Still another construction is a disc wheel having a rim permanently attached to the periphery thereof, the disc being dished so that the rim is disposed laterally of the hub thereof, the disc being reversible on the hub so as to provide two different lateral positions of the rim.

The chief objects of this invention are to provide an improved wheel and rim construction of the character mentioned wherein the tire rim has four alternative positions; to provide a wheel and rim of the character mentioned that will have relatively few parts; that will enable the rim position quickly and easily to be mounted in any of its alternative positions; and that may be produced easily and economically by the altering of an existing wheel and rim structure wherein the rim has but two alternative positions. Other objects will be manifest as the specification proceeds.

Of the accompanying drawing:

Figure 1 is a fragmentary diametric section of a wheel and rim structure of known construction, wherein the rim portion has two alternative positions, one of said positions being shown in full lines and the other position being shown in broken lines;

Figure 2 is a fragmentary sectional perspective view of the wheel disc shown in Figure 1, showing how the same is cut and punched to provide the wheel and rim structure of the present invention;

Figure 3 is a fragmentary side elevation of the improved wheel and rim structure; and Figure 4 is a section on the line 4—4 of Figure 3, showing three alternative positions of the tire rim in broken lines.

Referring now to Figure 1 of the drawing, there is shown a wheel and rim structure of known construction, the same comprising a wheel hub 10, a wheel disc 11, and a tire rim 12, the latter being of the well known drop-center type, although other types of rim may be employed if desired. The wheel disc 11 is axially apertured as usual, and is secured to a radial flange on the hub 10 by means of the usual stud bolts 13. The tire rim 12 is permanently secured to the periphery of the disc 11, as by being welded thereto. The major portion of the disc 11 is dished or concavo-convex in shape, and there is a portion 11a at the inner circumference of the disc that is disposed parallel to the plane of the rim and is laterally offset from the major portion of the disc, on a convex side thereof, and joined to said major portion by an intervening cylindrical portion 11b that is concentric with the axis of the disc. Alternative positions of the rim 12 are obtained by reversing the position of the disc 11 on the hub 10.

The improved wheel and rim structure of the present invention is constructed from that previously described simply by shearing the wheel disc 11 along a uniformly sinuous course 15 that is generally concentric with the axis of the disc, and radially outwardly of the cylindrical portion 11b thereof, and by punching a circumferential series of equally spaced apertures 16, 16 in the disc, which apertures are all equi-distant from the axis of the disc, and alternately disposed on opposite sides of the sinuous cut 15. As the result of the said shearing operation there is provided an annular dished wheel disc, hereinafter designated 18, that has its inner circumference shaped in scallops comprising inwardly projecting tongues 19 separated by intervening recesses 20 (Figure 2), and an annular adapter 21 having its periphery formed with complemental scallops comprising outwardly projecting tongues 22 and intervening recesses 23. As is most clearly shown in Figure 4, the adapter 21 has a medial cylindrical portion formed with a radially inwardly extending portion on one margin thereof, and a radially outwardly extending portion on the other margin thereof, the latter portion being scalloped.

The arrangement is such that by turning the disc 18 angularly relatively of the adapter 21, the tongues 19 of the disc may be brought into registry with the tongues 22 of the adapter, at which time the apertures 16 in the two sets of tongues will be in registry. The disc and adapter are secured to each other by bolts 25 in the said apertures 16. Like the prior art structure shown in Figures 1 and 2, the adapter 21 is secured to the hub 10 by the stud bolts 13, and the tire rim 12 is permanently mounted upon the periphery of the wheel disc 18.

The adapter 21 is mountable upon the hub 10 in the position shown in full lines in Figure 4, or in the reverse position shown in broken lines. In like manner the disc 18 is mountable upon the adapter in the position shown in full lines, and in the alternative position shown in broken lines, with the result that it is possible to position the tire rim 12 at four different positions axially of the hub 10, the latter having but one operative position lengthwise of its axle.

The invention is of relatively simple and economical construction and readily may be constructed simply by altering a certain prior art structure. The invention makes it relatively easy to alter the tread width of a vehicle, and achieves the other advantages set out in the foregoing statement of objects.

Modification may be resorted to without departing from the spirit of the invention or the scope thereof as defined by the appended claims.

What is claimed is:

1. In a wheel construction, the combination of an annular adapter mountable upon the hub of a vehicle, a reversible wheel disc mountable upon said adapter, the outer circumference of the adapter being greater than the inner circumference of the wheel disc to provide overlap portions, and bolts extending through the latter securing the disc to the adapter, said overlap portions consisting of radial tongues separated by intervening recesses, the latter being of sufficient width to enable the tongues to pass therethrough so that the wheel disc may be passed over the adapter, while both are concentrically disposed, and mounted on either side of said adapter.

2. In a wheel construction, the combination of an annular adapter mountable upon the hub of a vehicle, a reversible wheel disc mountable upon said adapter, the inner marginal portion of the wheel disc and the peripheral portion of the adapter being complementally scalloped to form tongue portions separated by intervening recesses, the latter being of sufficient width to enable the tongues of the other element to pass therethrough, the tongues of one element being registerable with the tongues of the other element upon relative angular movement of the elements, and means for securing the disc to the adapter by means of fastening elements extending through said tongues.

WINFIELD S. BRINK.